United States Patent [19]

Fritsch

[11] Patent Number: 4,591,487
[45] Date of Patent: May 27, 1986

[54] METHOD AND APPARATUS FOR THE CONTINUOUS PRODUCTION OF HIGH-MOLECULAR POLYMERS

[76] Inventor: Rudolf P. Fritsch, Goslarer Str. 58, 7000 Stuttgart-31, Fed. Rep. of Germany

[21] Appl. No.: 522,047

[22] Filed: Aug. 10, 1983

Related U.S. Application Data

[63] Continuation of Ser. No. 289,256, Aug. 3, 1981, abandoned.

[30] Foreign Application Priority Data

Mar. 13, 1980 [DE] Fed. Rep. of Germany ....... 3030541

[51] Int. Cl.[4] .......................... B01F 7/26; B01J 14/00
[52] U.S. Cl. .................................... 422/134; 366/83; 422/131; 422/135; 422/229; 425/204
[58] Field of Search ............... 422/131, 135, 137, 138, 422/225, 229, 134; 366/83; 425/204; 159/2 E; 55/191

[56] References Cited

U.S. PATENT DOCUMENTS

| | | | |
|---|---|---|---|
| 2,563,396 | 8/1951 | Colombo | 425/204 |
| 2,814,472 | 11/1957 | Erdmenger | 366/301 |
| 2,942,294 | 6/1960 | Reifenhauser | 425/204 |
| 3,216,706 | 11/1965 | Loomans | 366/85 |
| 3,442,065 | 5/1969 | Foras | 55/191 |
| 4,040,607 | 8/1977 | Ullrich | 366/85 |
| 4,107,787 | 8/1978 | Ocker | 159/2 E |

FOREIGN PATENT DOCUMENTS

| | | |
|---|---|---|
| 397961 | 6/1924 | Fed. Rep. of Germany . |
| 1074264 | 1/1960 | Fed. Rep. of Germany . |
| 1084907 | 7/1960 | Fed. Rep. of Germany . |
| 1099996 | 2/1961 | Fed. Rep. of Germany . |
| 1719453 | 3/1970 | Fed. Rep. of Germany . |
| 938305 | 10/1963 | United Kingdom . |

OTHER PUBLICATIONS

Article "Schneckenmaschinen in der Verfahrenstechnick" of Herrmann, Springer Verlag 1972, pp. 35 (next to last para.), 120, 154 to 157, 163.
Periodical "Chemie–Ingenieur–Technik", 1964, pp. 177 to 179 and 184 (FIG. 27).
Publication "KS–Information Kurzmitteilung Nr. 18" of a German Company (Werner & Pfleiderer), published 1972, p. 6.

Primary Examiner—Michael S. Marcus

[57] ABSTRACT

Apparatus for the continuous production of high molecular polymers in which a plurality of parallel screw shafts coupled together for rotary movement in the same direction within a casing are partially disposed in trough-like recesses in the casing wall and enclose a devolatilization chamber having an opening for connection to a vacuum and forming an extrusion unit with the casing and in which the shafts carry spaced noncircular kneading disks oriented in staggered relationship on the shaft axes with the disks of adjacent shafts meshing to scrape the substance to be treated from each other.

7 Claims, 6 Drawing Figures

METHOD AND APPARATUS FOR THE CONTINUOUS PRODUCTION OF HIGH-MOLECULAR POLYMERS

This is a continuation of application Ser. No. 289,256 filed Aug. 3, 1981 now abandoned.

With regard to the continuous polymerization of synthetic materials the so-called end stages of polymerization, in particular, of the known polymerization devices have serious disadvantages when the substance to be treated, when polymerized, reaches viscosities over approx. 5,000 poises. These disadvantages are to be seen particularly in the following: The polymerization process often releases gases, which hinder polymerization but, previously, could not be completely removed in the case of highly viscous substances. As many polymerization processes are exothermic reactions the heat must be uniformly removed from each element of volume of the substance to be treated; in the case of endothermic polymerization processes the surfaces of the reactor, which come into contact with the substance to be treated, are heated in order to feed heat uniformly to the substance to be treated. It is, however, a requirement for the feeding or removal of heat that no dead zones are formed within the reactor, that the surfaces of the reactor wetted with the substance to be processed are, as far as possible, scraped clean again and again and that the holding times of each unit of volume of the substance to be processed in the reactor are approximately the same so that a narrow holding time spectrum results.

Since the known reactors for continuous production of high-molecular polymers could not, for example, fulfill the requirement to remove as good as completely from the substance to be processed gases or solvents arising during polymerization, with the aid of which monomers were fed to the reactor, or other constituents of the substance to be processed such as water, which evaporate at the temperatures used for polymerization, the connecting of an apparatus to the outlet side of the final stage of polymerization of such a reactor is already known, this apparatus serving the sole purpose of removing these volatile constituents from the polymerizate (U.S. Pat. No. 3,442,065). This "devolatilizer" contains four axially parallel cylinders in an enclosure; the adjacent cylinders mesh with each other and the cylinders are partially disposed in troughlike recesses in the enclosure wall, these recesses being parallel to the shaft axes. The cylinders also surround a devolatilization chamber in the centre of the enclosure, this chamber being connectable to a vacuum source. The shafts are constructed along their entire length as screw shafts with relatively shallow threads and extend with their tapering front ends, with regard to the direction of conveyance, into passages of a corresponding cross-sectional form, these passages being provided in a front wall of the enclosure so that the shaft ends, together with the passages, form extrusion units for the discharge of the substance to be processed. An additional passage opening into the central devolatilization chamber is disposed between these passages and in the centre of the aforesaid front wall of the enclosure; this is the connection to the vacuum source. Finally, the enclosure is partially constructed with a double wall so that the enclosure may be fed with a heat carrier fluid.

However, even if such a special devolatilizer is used the disadvantage mentioned at the beginning can still not be sufficiently eliminated since, especially in the case of highly viscous polymers, the disadvantages of the end stage of polymerization are in no way alleviated and, even in the devolatilizer, volatile constituents are certainly not completely removed since it can in no way be guaranteed, due to the construction of the shafts as screw shafts, that each element of volume of the substance to be processed will come to the surface in the area of the devolatilization chamber and thereby be volatilized.

The object of the invention was, therefore, to create a method as well as an apparatus for continuous production of high-molecular polymers which enable gaseous constituents, arising above all during the polymerization process, to be more completely removed than was previously possible, also in the case of a highly viscous substance to be processed.

Proceeding on the basis of a method for continuous production of high-molecular polymers, with which the low-molecular starting substances are mixed with catalysts and/or initiators and, in particular, subjected to heat treatment this object may be resolved according to the invention in that the substance to be treated, while it is being subjected to a vacuum, is repeatedly kneaded into thin layers and simultaneously polymerized, volatile constituents being eliminated at the same time, the polymerizate then being discharged by way of extrusion. In the case of an apparatus comprising a casing, in which several drivable, axially parallel shafts are rotatably mounted, adjacent shafts meshing with each other, these shafts being partially disposed in troughlike recesses in the casing wall, these recesses being parallel to the shaft axes, the shafts also enclosing a devolatilization chamber connectable to a vacuum source and forming, together with the casing, an extrusion unit with each of its front ends, with regard to the direction of conveyance, these ends being formed as screw shaft sections, the set object is resolved in that the shafts have, at least along part of the devolatilization chamber, kneading discs disposed in tandem in axial direction, these discs having a cross section differing from a circle concentric to the shaft axis and being disposed along each shaft axis as well as angularly orientated with regard to the shaft axis such that a conveying effect results from the angular staggering of the kneading discs of each shaft and the adjacent discs of shafts meshing with each other peel off the substance to be treated from each other.

This type of shaft having discs, the shafts meshing with each other, is actually known (DE-OS No. 25 50 969) but for machines used for the homogenization of a substance to be processed, these machines not having any devolatilization chamber between the shafts.

The solution to the problem according to the invention has the following advantages:

Due to the large area of the kneading discs' free front surfaces, from which the substance to be processed is however peeled off at each rotation by the adjacent kneading discs of the adjacent shafts, practically all the elements of volume of the substance to be processed reach the surface in the area of the devolatilization chamber and the gas bubbles also carried to the surface of the substance to be processed are destroyed so that the gas does not have to travel along the shafts through the substance to be processed to a devolatilization outlet, as is the case with the known reactors.

The fact that the substance to be processed is repeatedly peeled off from the large surfaces offered to this substance results not only in an optimum conveyance of heat to and from the substance to be processed but also prevents the formation of dead zones and thermically damaged substances. The fact that dead zones are avoided, together with the obligatory conveyance effected by the shafts, leads to an extremely narrow holding time spectrum for the substance to be processed.

Due to the discharge of the polymerizate by way of extrusion pressure is produced at the outlet of the apparatus according to the invention so that the vacuum connected to the devolatilization chamber does not prevent the discharge of the polymerizate.

Moreover, the kneading of the substance to be processed has a particularly good dispersing and mixing effect so that catalysts or initiators are mixed more or less completely with the low-molecular starting substances.

Due to the fact that the surfaces scrape each other clean and the substance is obligatorily conveyed through the reactor the reactor can be emptied in the shortest possible time when the supply of starting substances is stopped.

Due to the fact that the kneading discs of the shafts, which mesh with each other, introduce high tangential stresses into the substance to be processed when these discs slide past each other the substance to be processed is not only particularly well homogenized but a uniform distribution of temperature in the micro area also results.

With one preferred embodiment of the method according to the invention the substance to be treated is, during polymerization and kneading, subjected in consecutive steps to an increasing vacuum and conveyed from step to step by way of extrusion. An apparatus particularly well suited to carrying out such a method is one, in which the casing has several devolatilization chambers disposed one after the other, these being separated from each other by partitions each having a passage for each shaft located on the upstream side of the partition; a feed pressure serving to separate the devolatilization chambers in terms of pressure can be produced in front of the passage by means of the screw shaft section upstream of each partition. In this way the vacuum affecting the substance to be processed can be adjusted to its viscosity which increases during polymerization.

A separate set of shafts may, of course, be provided for each of the devolatilization chambers. It is, however, easier and cheaper when each of the shafts extends through the whole length of the reactor, i.e. when the shafts extend through the passages of at least one of the partitions and form with the passage wall a ring slot filled with the substance to be treated so that in this ring slot the substance to be treated serves to bear and lubricate the shafts. For this purpose it is particularly advantageous if each of the screw shaft sections connected in front of the passages forms, together with the parts of the casing surrounding these sections, an extrusion unit which forces the substance to be processed under high pressure through the following ring slot so that the shaft section extending through the passage swims as it were in the substance to be processed.

Additional features, details and advantages of the invention are given in the attached claims and/or the following specification and the attached drawings of a preferred embodiment of the reactor according to the invention; the drawings show:

Figure 1:
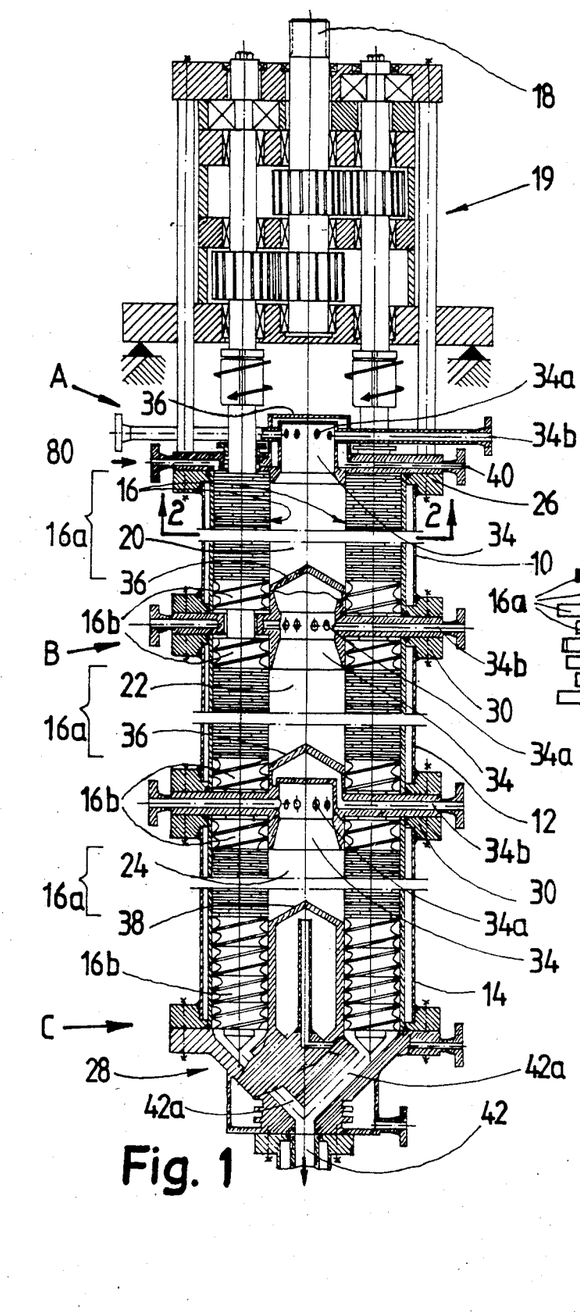
FIG. 1 a longitudinal section through the reactor.

Firstly, the overall construction of the reactor according to the invention will be explained on the basis of FIG. 1.

Figure 2:
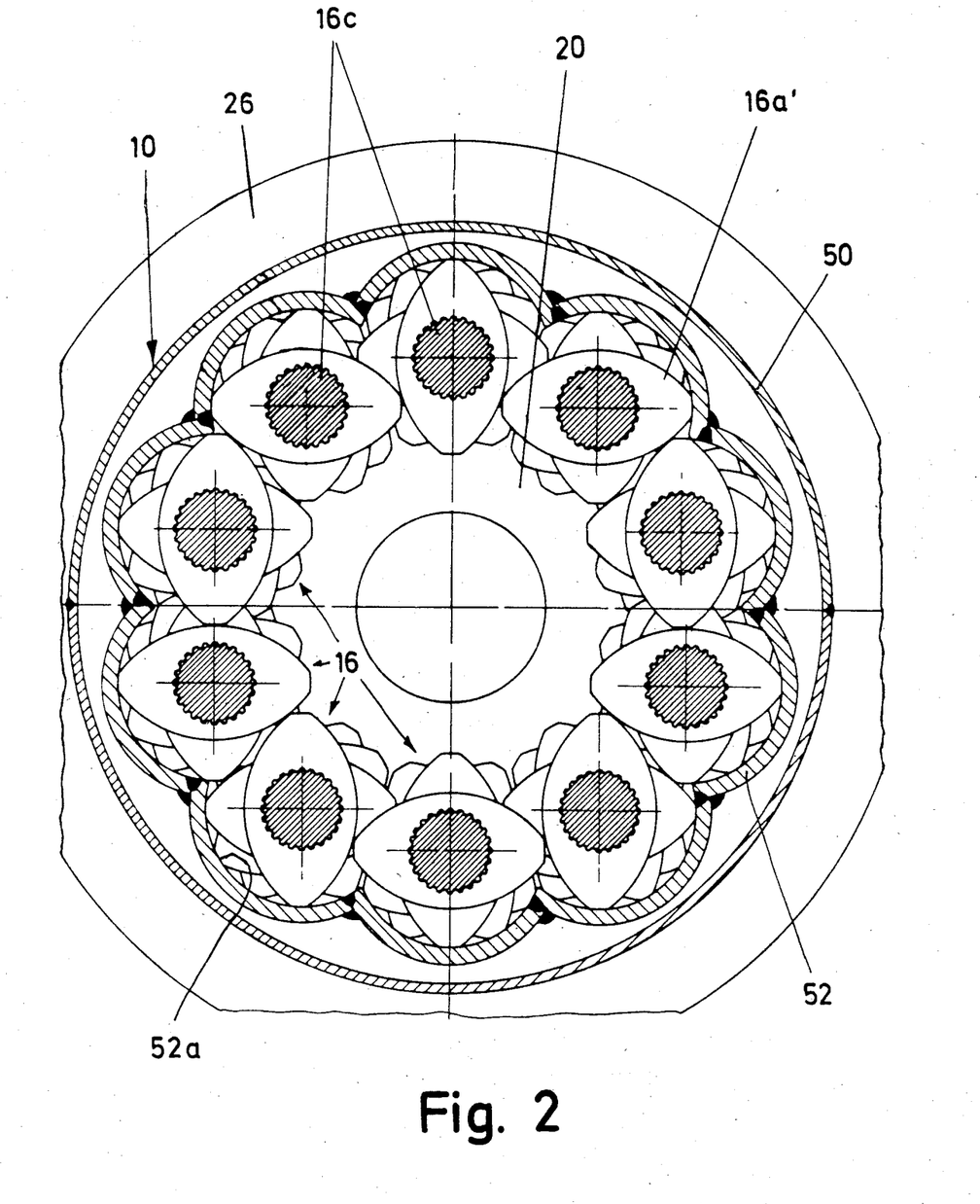
FIG. 2 a cross section through the first stage of the reactor along the line 2—2 in FIG. 1.

The reactor has several casing sections 10, 12 and 14 disposed one after the other, through which several, in the preferred embodiment ten, shafts 16 extend. These shafts are, as can be seen in FIG. 2, disposed in the shape of a wreath around the devolatilization chamber 20, 22 and 24 contained in each casing section and are driven by a motor, which is not illustrated, via a drive shaft 18 and gearing 19 jointly and, preferably, in the same direction.

The reactor is sealed at the top by a plate 26 and at the bottom by a locking piece 28 while the partitions 30 separate the casing sections 10, 12 and 14 as well as the pertinent devolatilization chambers 20, 22 and 24.

Each of the shafts 16 has several kneading sections 16a and several screw shaft sections 16b—casing section 10 has one kneading section 16a and one screw shaft section 16b, casing sections 12 and 14 each have one kneading section 16a and two screw shaft sections 16b, one on each side of the kneading section 16a. The construction of the shafts 16 in the area of the partitions 30 will be explained on the basis of FIG. 3.

Each devolatilization chamber 20 or 22 or 24 has, on top, an associated steam dome 34 which has preferably the same number of openings 34a and drain pipes 34b connected thereto as the number of shafts 16; the drain pipes 34b extend between the shafts and in radial direction towards the outside.

The steam domes 34 associated with the devolatilization chambers 22 and 24 are covered by casing shoulders 36, which, when seen in the plan view from above, correspond approximately to a pinion with concave peripheral depressions and enclose the adjacent screw shaft sections 16b of the shafts 16 over a part of their circumference almost free from play. In the following they are to be designated extrusion casing shoulders. A corresponding extrusion casing shoulder 38 is mounted on the lower locking piece 28.

Figure 3:
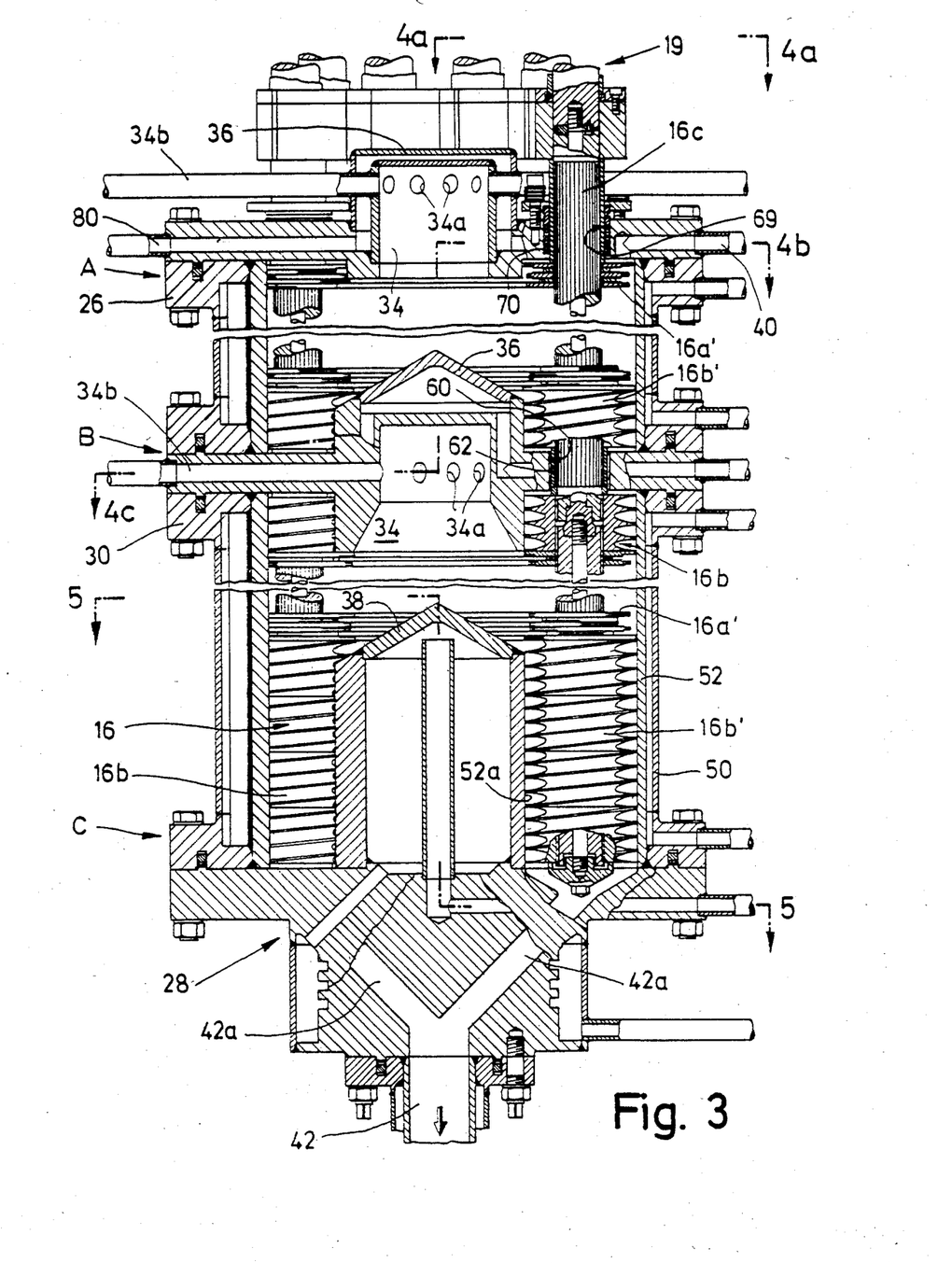
FIG. 3 an enlarged illustration of the areas A, B and C in FIG. 1.
Figure 5:
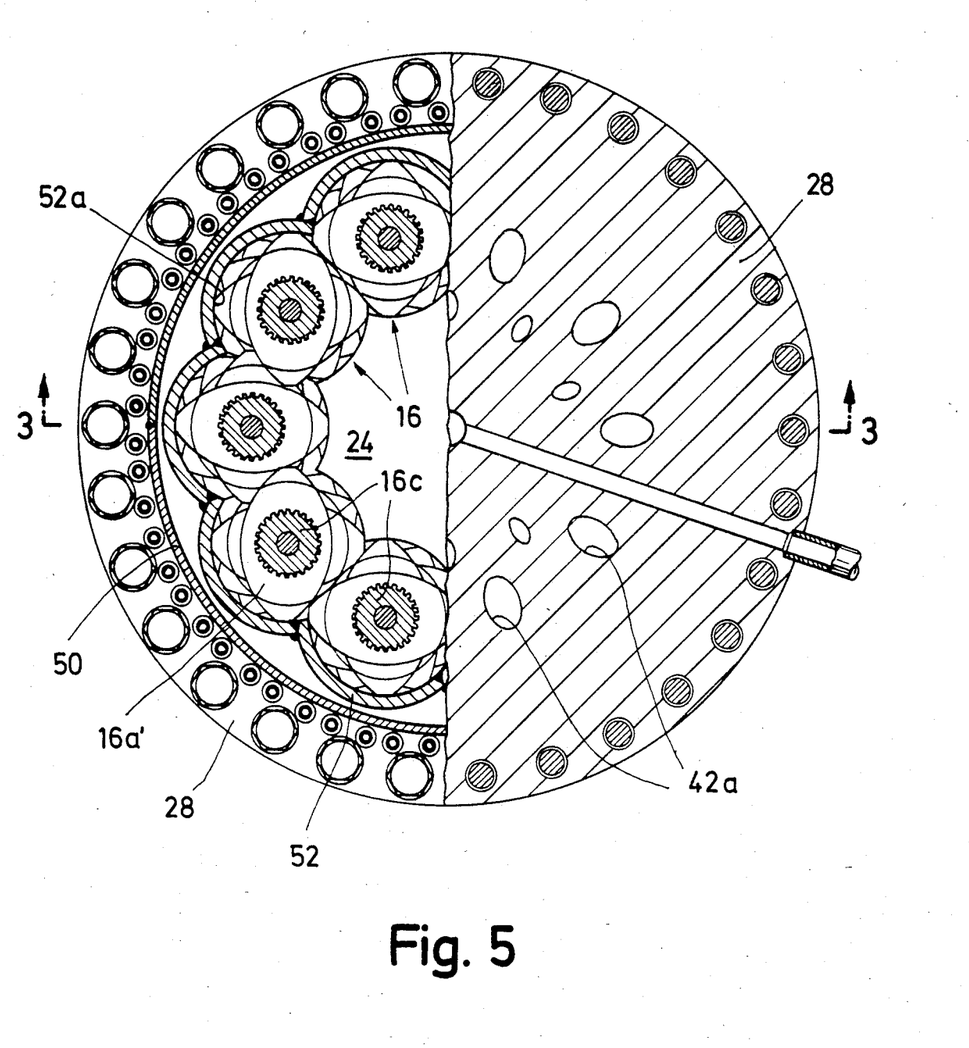
FIG. 5 a section along the line 5—5 in FIG. 3.

Substance feeding passages 40 are provided at the top end of the first casing section 10. The substance or substance mixture to be treated is supplied to the first casing section 10 via these passages. The reactor preferably has the same number of substance feeding passages 40 as shafts 16 and these substance feeding passages extend inwards between the shafts in a radial direction. As shown by FIGS. 1, 3 and 5 processed substance leaves the reactor via an outlet passage 42, which is provided in the locking piece 28 and constructed as a collecting passage and to which an outlet duct 42a leads from the lower end of each shaft.

As shown in FIGS. 2 and 5 each of the casing sections 10, 12 and 14 has an outer liner 50 and a rosette-shaped inner liner 52, which forms a trough 52a for each shaft 16, this trough being parallel to the shaft axis; each shaft fits into this trough with very little play.

Figure 6:
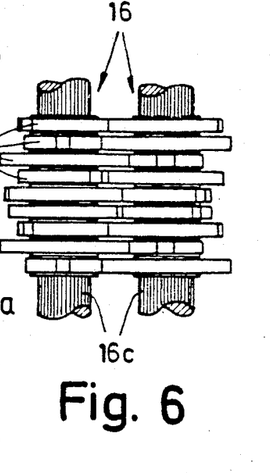
FIG. 6 a view of two sections, provided with kneading discs, of two adjacent shafts as seen from one of the devolatilization chambers.

Each of the shafts 16 has a core shaft 16c to carry the kneading discs 16a' in the area of the kneading sections 16a and the screw shafts 16b' (see FIG. 3) in the area of the screw shaft sections 16b. In order to secure the kneading discs 16a' and the screw shaft sleeves 16b' on the core shafts 16c against turning teeth, as illustrated, a key or the like may be provided. In the view along the shaft axis the kneading discs have a cross section, the circumference of which differs from a circle concentric to the shaft axis. Preferably, the kneading discs have the oval shape illustrated in FIG. 2. With regard to their angle of rotation they are disposed relative to the core shaft 16c such that the points having the greatest radial distance from the shaft axis are located in the known way along a helix so that the kneading discs 16a', which are disposed in tandem and angularly staggered, also have a conveying effect in a radial direction. In addition, the shafts 16 are disposed relative to each other such that both the sets of kneading discs and the screw shaft sleeves 16b' of adjacent shafts 16 mesh with each other as shown in FIGS. 2 and 6 with regard to the kneading discs 16a': In respect of FIG. 6 it may be noted in this connection that the axial space between the kneading discs 16a' has been exaggerated to enable the drawing to give a somewhat clearer picture.

At the lower end of each stage of the reactor according to the invention, i.e. at the lower end of each casing section 10, 12 and 14, the inner liner 52 forms an extrusion unit with each extrusion casing shoulder 36 or 38 and the screw shaft sleeves 16b' of the screw shaft sections 16b surrounding the extrusion casing shoulders. The extrusion units provide for obligatory conveyance of the substance to be processed within the area of each shaft in axial direction out of each casing section 10, 12, 14. As shown in the right half of FIG. 3 a passage duct 60, coaxial to the shaft axis, is provided for this purpose in each of the partitions 30 for each shaft. This duct forms with each core shaft 16c a ring slot 62 surrounding this core shaft. The screw shaft sleeve 16b' located upstream of each of these ring slots produces such high pressure in the substance to be processed in front of the ring slot that the substance is forced through the ring slot 62 into the next casing section 12 or 14 lying below it and at the same time forms a bearing for the core shaft 16c provided in this area with a sleeve which is smooth on the outside and lubricates this core shaft.

The screw shaft sections 16b provided at the lower ends of shafts 16 see to it that the polymerized and volatilized substance is discharged from the reactor according to the invention through the outlet ducts 42a and the outlet channel 42.

The pressure-tight fit of the core shafts 16c as they are led through the plate 26 is shown in FIG. 3, in which a bearing duct 69 with slide ring sealings 70 is illustrated for one of the core shafts 16c.

Finally, FIG. 3 shows that the substance feeding passages 40 end directly adjacent to the kneading discs 16a' of the pertinent shaft 16 so that the substance to be processed is immediately treated and obligatorily conveyed in an axial direction.

Figure 4:
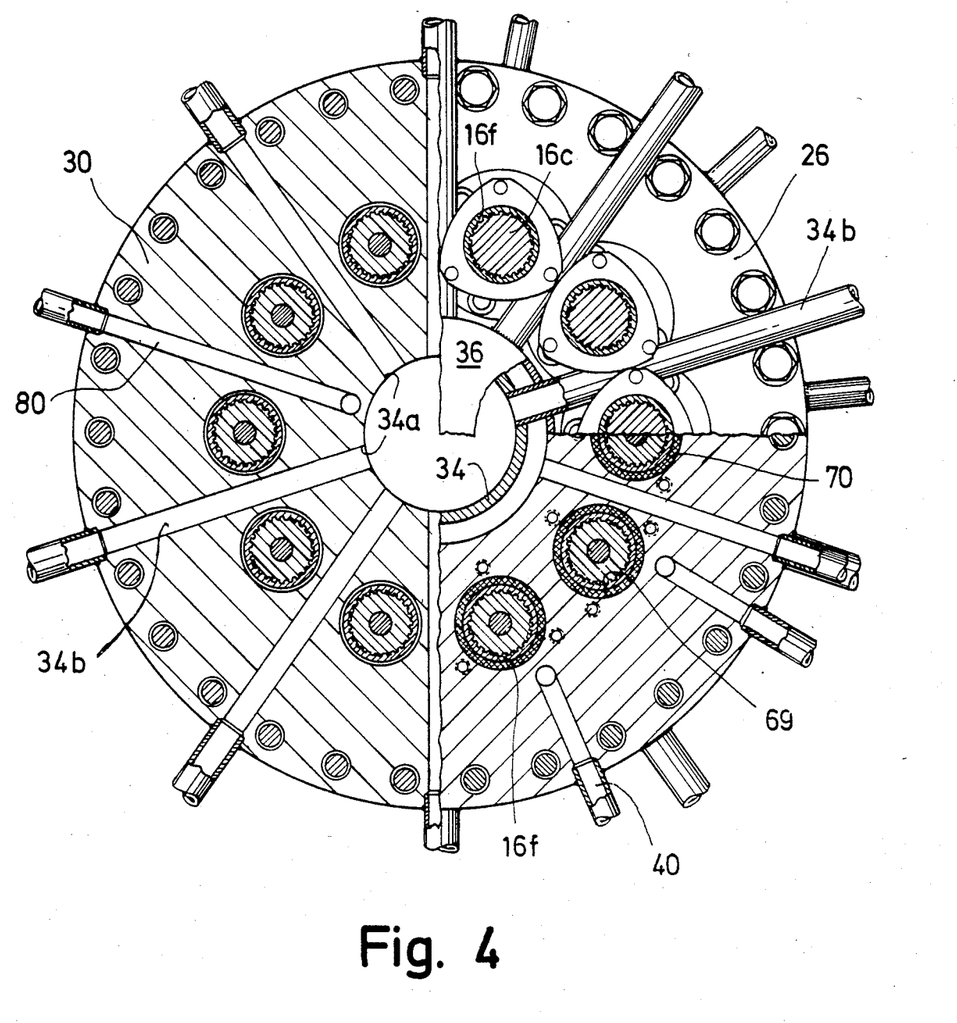
FIG. 4 in the top right-hand quarter a cross section along the line 4a of FIG. 3; in the bottom right-hand quarter a cross section along the line 4b of FIG. 3 and on the left-hand side a cross section along the line 4c of FIG. 3.

As can be seen from FIGS. 2, 3 and 5, for example, the casing of the reactor according to the invention is to a very large extent double-walled or provided with inner cavities so that it can be cooled or heated with the aid of a heat exchanger fluid. FIG. 4, for example, shows a passage 80 for the supply of a heat carrier fluid to the extrusion casing shoulder 36 of one of the partitions 30 illustrated in the middle of FIG. 3.

Due to the relatively large area of the free front surfaces of the kneading discs 16a' the ratio of the moving inner surfaces to the entire inner surface of the reactor, which is offered to the substance to be processed, may be considerably increased and, therefore, the total volume of the reactor required to achieve the desired effect may be kept relatively small. At the same time it is guaranteed that the major part of the moving surfaces wetted by the substance to be processed, i.e. the surfaces of the kneading discs 16a', are wiped off again and again which is just as important for a good homogenizing effect and high efficiency during devolatilization as for good heat transport and to avoid thermic damage to the substance to be processed. Due to the high homogenizing effect and narrow holding time spectrum the polymerizate produced with the reactor according to the invention also has a narrow spectrum with regard to the distribution of molecular weight.

As can be seen in FIG. 3 the shafts are, for reasons of functional efficiency and assembly, divided in the area of the screw shaft sleeves 16b' and the parts of the shafts connected with each other via these sleeves.

Due to the extrusion units located upstream of the ring slots 62 the reactor according to the invention has the advantage that the devolatilization chambers 20, 22 and 24 can be kept at different pressures independently of each other so that the vacuum, to which the substance to be processed is subjected, may be increased from step to step.

With the reactor according to the invention it has been possible to eliminate the post-condensation and extraction facilities previously required, to produce polymerizates of the highest viscosity in one single end stage of polymerisation and at the same time to keep the residual monomers, solvents or parts of water contained in the substance to be processed below the desired limits.

As usual the meaning of the term "polymerisation" should not be restricted to the reaction type of polymerisation, but should also cover the reaction types of polyaddition and polycondensation.

The invention is particularly useful in the production of Nylon, polycarbonates and polyesters.

Having thus described the invention, what is claimed is:

1. Apparatus for the continuous production and devolatilization of high molecular polymers from a substance, said apparatus comprising a casing, a plurality of parallel feeding shafts, means mounting said shafts for rotation in said casing, each of said shafts having at least one screw shaft section and one kneading section, a plurality of kneading disks in each of said kneading sections, the disks of each plurality of being disposed in tandem along the axis of the associated shaft, said disks having a noncircular outline around the associated shaft axis and being relatively angularly oriented in staggered relationship with reference to the associated shaft axis for feeding said substance, said screw shaft section being disposed downstream of said kneading section, said screw shaft section cooperating with said casing to form an extrusion unit, the kneading disks of adjacent shafts meshing with each other to scrape off the substance to be treated from each other, and a devolatilization chamber within said casing adjacent the kneading sections of said shafts, said devolatilization chamber having an opening for connection to a vacuum source, characterized in that the kneading disks of each of said shafts mesh with the kneading disks of two adjacent shafts to enclose said devolatilization chamber, and that means are provided for coupling said shafts to each other for rotary movement in the same direction.

2. Apparatus according to claim 1, characterized in that the area of the free front surfaces of the kneadings discs (16a') is many times the surface area of the inside of the casing.

3. Apparatus according to claim 1, characterized in that several feeding passages (40) are provided for the substance to be treated, the number of said passages being at least equal to the number of the shafts (16).

4. Apparatus according to claim 1, characterized in that the shafts (16) are vertically disposed.

5. Apparatus according to claim 1, characterized in that a clearance of not more than approx. 0.3 mm is provided between the surfaces moving relative to each other and wetted with the substance to be treated.

6. Apparatus according to claim 1 characterized in that the casing (26, 10, 12, 14, 28) has several devolatilization chambers (20, 22, 24) disposed one after the other, said chambers being separated from each other by partitions (30), each having a passage (60) for each shaft (16) located on the upstream side of the partition, a feed pressure, serving to separate the devolatilization chambers in terms of pressure, being produceable in front of the passage by means of the screw shaft section (16b) upstream of each partition, drain means (34, 34b) for each devolatization chamber (20,22,24) and means for creating an increasing vacuum from one devolatization chamber to the next chamber located downstream of the preceding chamber.

7. Apparatus according to claim 6, characterized in that the shafts (16) extend through the passages (60) of at least one of the partitions (30) and form with the passage wall a ring slot (62) filled with the substance to be treated so that in this ring slot the substance to be treated serves to bear and lubricate the shafts.

* * * * *

UNITED STATES PATENT AND TRADEMARK OFFICE
CERTIFICATE OF CORRECTION

PATENT NO. : 4,591,487
DATED : May 27, 1986
INVENTOR(S) : RUDOLF P. FRITSCH

It is certified that error appears in the above-identified patent and that said Letters Patent are hereby corrected as shown below:

On the title page, under "[30]" "Mar.13, 1980" should be --Aug. 13, 1980--.

Signed and Sealed this

Seventh Day of October, 1986

[SEAL]

Attest:

DONALD J. QUIGG

Attesting Officer

Commissioner of Patents and Trademarks